United States Patent [19]

Kuhn

[11] Patent Number: 5,135,128
[45] Date of Patent: Aug. 4, 1992

[54] WATER KETTLE

[75] Inventor: Jacques Kuhn, Rikon, Switzerland

[73] Assignee: Heinrich Kuhn Metallwarenfabrik AG, Rikon, Switzerland

[21] Appl. No.: 605,966

[22] Filed: Oct. 20, 1990

[30] Foreign Application Priority Data

Dec. 22, 1989 [CH] Switzerland .......................... 4646/89

[51] Int. Cl.$^5$ ............................................. B65D 43/00
[52] U.S. Cl. .................... 220/318; 220/331; 220/912; 222/469
[58] Field of Search ............... 220/318, 262, 330, 331, 220/912; 222/469

[56] References Cited

U.S. PATENT DOCUMENTS

| | | | |
|---|---|---|---|
| 1,486,802 | 3/1924 | Royse | 222/469 X |
| 1,558,839 | 10/1925 | Clark | 220/262 |
| 2,254,141 | 8/1941 | Garcia | 220/262 |
| 2,624,493 | 1/1953 | Porter | 222/469 |
| 3,490,642 | 1/1970 | Friedlander | 220/331 |

Primary Examiner—Steven M. Pollard
Attorney, Agent, or Firm—Weiser & Stapler

[57] ABSTRACT

A water kettle is equipped with a handle, a first end of which is joined to lower regions of the side of the kettle by a hinge, and a second end of which is fitted on the diametrically opposite side with a spout lid for covering (and opening) the kettle's spout. When the kettle is in the rest position, as a result of its weight the handle will drop until the handle comes to stop on the spout and the spout lid covers the spout opening. When the kettle is lifted by the handle or tipped into the pouring position, the handle swings back to a stop in the spout and the associated spout lid is removed from the spout opening. Following this swiveling movement, the raised spout lid is brought into a position which deflects steam flowing out of the spout opening in such a way that a user's hand holding the handle is not directly exposed to the steam. The spout lid is provided with a device for emitting an acoustic signal when the boiling point is reached in the interior of the kettle. If desired, the water kettle may further include a second, larger filling and cleaning opening which is enclosed by a close-fitting lid to facilitate filling and cleaning of the interior of the kettle.

21 Claims, 3 Drawing Sheets

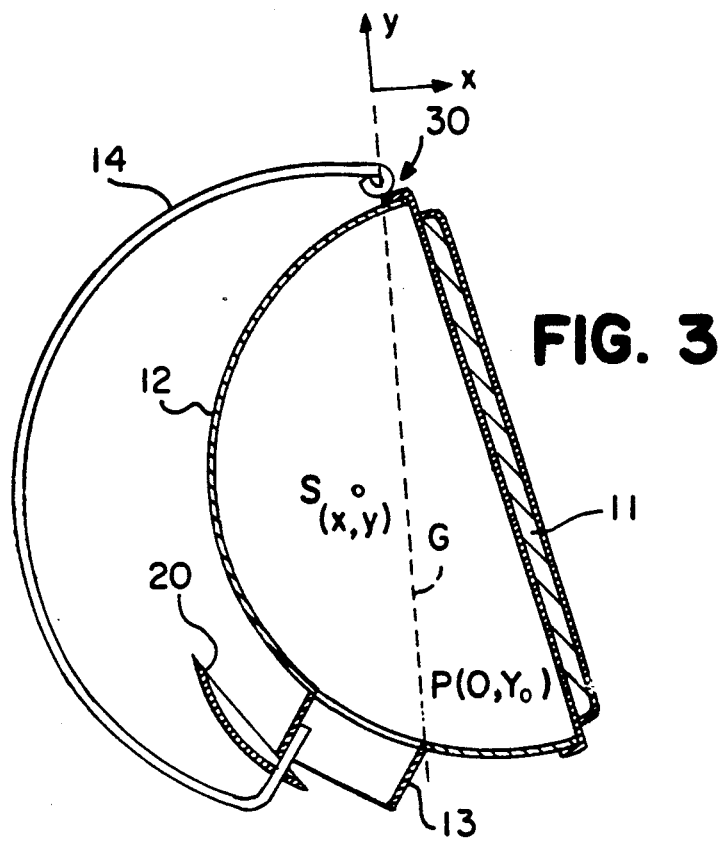
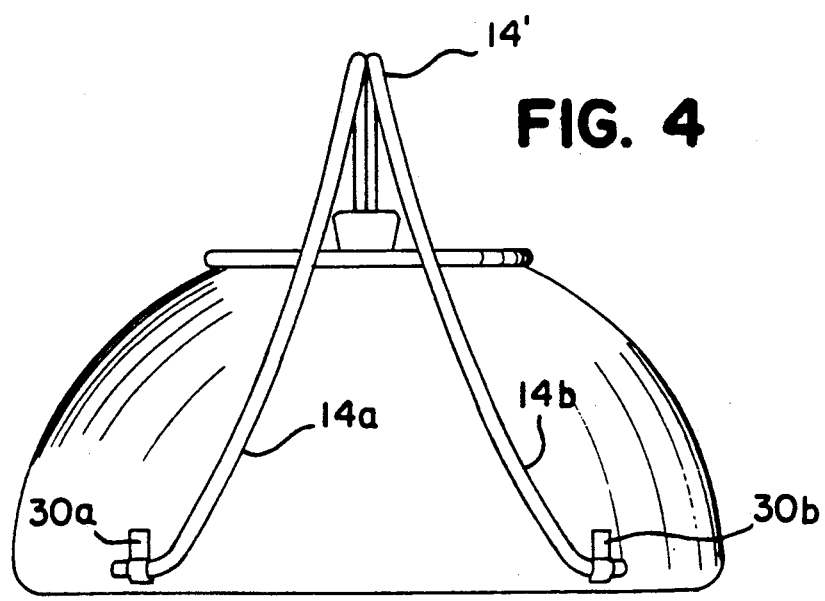

WATER KETTLE

BACKGROUND OF THE INVENTION

The present invention generally pertains to a water kettle, and more particularly, to an improved lid for covering the spout of the water kettle.

Water kettles are well known cooking vessels for boiling water or the like. It is common for such vessels to have no opening other than a spout for passing the fluid to be heated. In order to alert the user as to when the pressure of the steam produced upon heating exceeds atmospheric pressure, the spout is often enclosed by a cap which can emit an acoustic signal when the content of the kettle starts to boil.

Examples of fixed caps of this general type are disclosed in DE-U-72 99 444, DE-U-75 11 797 and DE-U-84 13 680. In such case, in order to pour hot water from the spout, the fixed cap (with the signalling device) must be removed from the spout. However, if the cap is not replaced when the kettle is placed back on the source of heat, there will then be no acoustic signal (failing to warn the user of the kettle) and the water may then completely evaporate upon further heating.

To overcome this potential for error, DE-A-32 41 883 discloses a whistling cap which is hinged at the spout and which can be tilted back to pour water from the spout responsive to a manually operated opening device. After use, the cap is automatically returned to the closed position. By suitably arranging a lever arm for operating the hinged cap, the water kettle can be operated with one hand. In any event, it is much less probable that such a whistling cap will not be replaced, so that it can continue to provide its warning function. Another advantage of the hinged whistling cap is that it protects the user's hand from exiting steam when the cap is opened.

Yet another whistling water kettle is disclosed in GB-A 349 511, which incorporates a whistling cap which is lifted from the spout when the kettle is lifted by its handle, and which is returned to its initial position over the spout when the kettle is put down. However, this kettle has the disadvantage that when water is poured from it, hot steam tends to rise from the spout in the direction of the user's hand. In addition, the kettle cannot be completely emptied with one hand, simply by holding the handle.

SUMMARY OF THE INVENTION

It is therefore the primary object of the present invention to provide a water kettle having a lid for the kettle's spout which is easily operated (opened), yet which is automatically returned to its rest position (enclosing the spout) when not in use, or when in a heating position on a source of heat.

It is also an object of the present invention to provide a water kettle having a lid for the kettle's spout which can be brought to an open position without touching the lid so that the user's hand (holding the handle of the kettle) is automatically heat-protected while uncovering the spout, and pouring a boiling liquid.

It is further an object of the present invention to provide a lid for the spout of a water kettle which further incorporates a separate opening which facilitates cleaning of the kettle.

These and other objects are achieved in accordance with the present invention by providing a water kettle having a hollow body defined by a flat bottom and a dome-shaped, arched upper portion, a spout extending from the upper portion, and a handle which takes the form of a hinge-mounted strap with one end fixed on an axis of rotation located opposite to the spout and near the bottom of the upper portion, and a free end which is provided with a spout lid for covering the spout (when the kettle is at rest) and for uncovering the spout (when the kettle is carried or for pouring), such that the tilt angle of the assembly is limited by at least one stop.

For further detail regarding a water kettle produced in accordance with the present invention, reference is made to the detailed description which is provided below, taken in conjunction with the following illustrations.

BRIEF DESCRIPTION OF THE DRAWINGS

FIG. 3 is a sectional view similar to FIG. 2, but in the emptying position for pouring.

FIG. 4 is a rear view of a water kettle showing a double mounted handle which is hingedly connected to lower regions of the upper portion of the kettle.

DETAILED DESCRIPTION OF THE PREFERRED EMBODIMENTS

Figure 1:
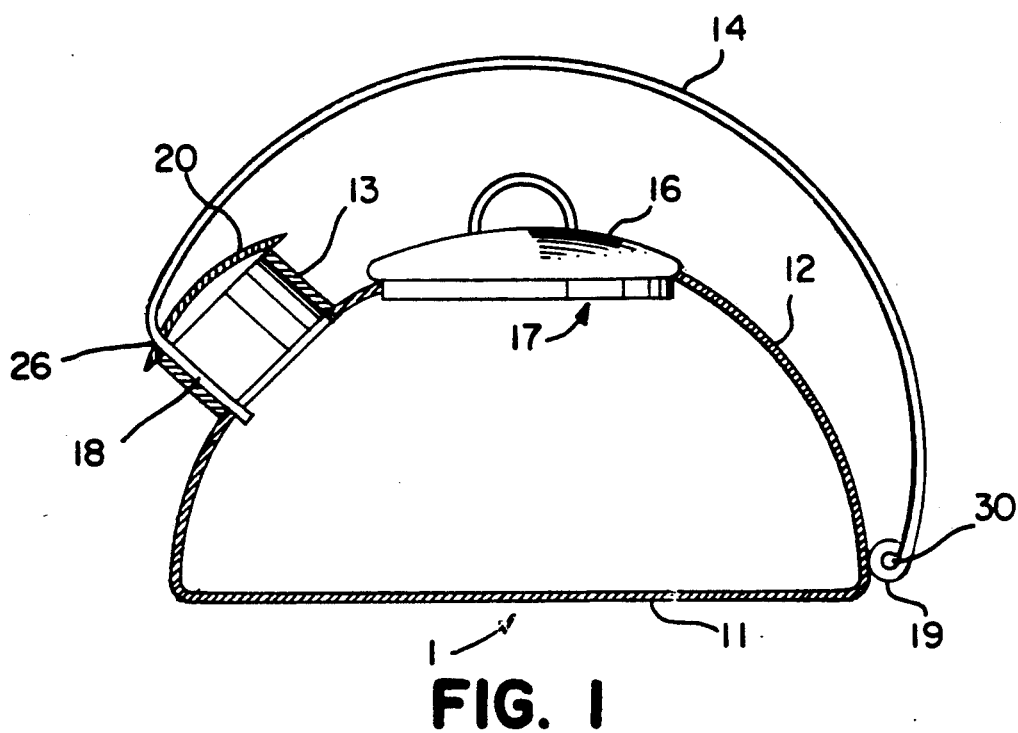
FIG. 1 is a sectional view of a water kettle in the rest position, shown as a single-piece construction with an enlarged opening in its upper portion, combined with a close-fitting lid.

The water kettle 1 shown in FIG. 1 takes the form of a hollow body which is formed in a way so that it can be designed in one piece. The dome-shaped, arched upper portion 12 has an enlarged opening 17 which permits easy filling and convenient access to the inside of the water kettle 1, for ease in cleaning. The opening 17 can be enclosed by an appropriate lid 16, e.g., formed as a close-fitting plug-in lid.

Figure 2:
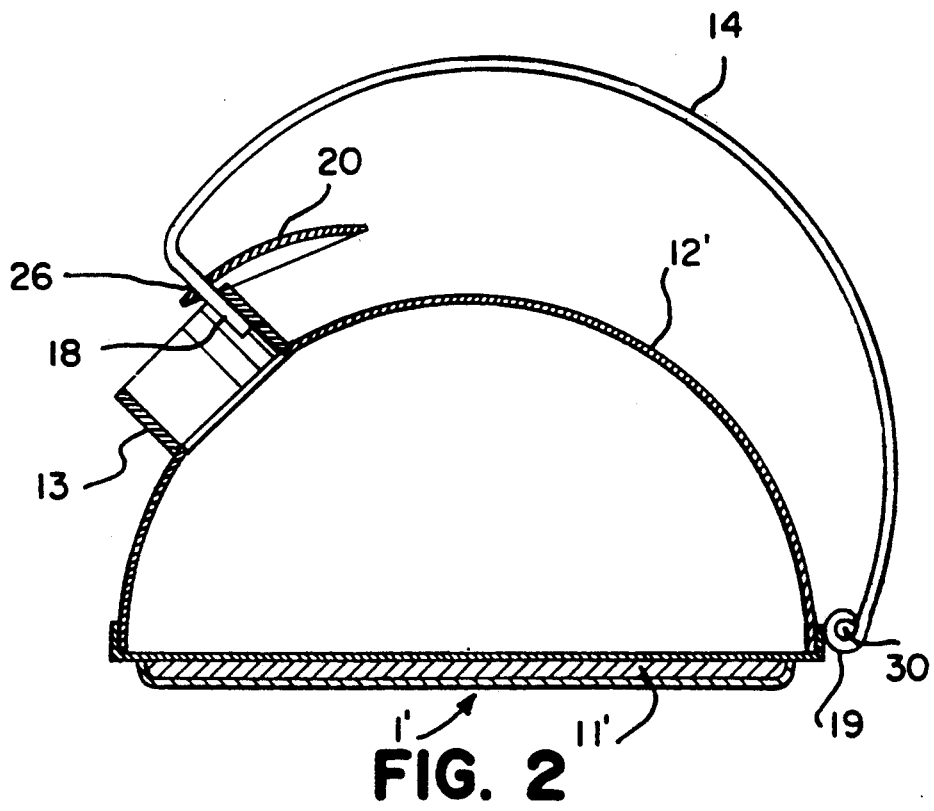
FIG. 2 is a sectional view of a water kettle in the carrying and pouring positions, shown as a two-piece construction with an enclosed upper portion which is connected in water-tight manner to the bottom of the water kettle.

FIG. 2 shows a water kettle 1' which does not incorporate the large filling and cleaning opening 17 of FIG. 1. This water kettle 1' is formed in two pieces and includes a bottom 11' and an upper portion 12' which are connected in watertight manner. If desired, the bottom 11' can be designed for different types of heating, for the type of stove to be used (e.g., a gas stove or an electric heating element, an electrically or inductively heated cooking surface, or for steam heating when used as a caldron), or to receive associated cooking implements such as a warmth-maintaining device (e.g., a hot plate) or a casserole.

Both of these water kettles 1, 1' have in common a handle 14 which is hinged at one end 19 connected along lower regions of the upper portion 12, 12', and which at the other end 18 engages the pouring spout 13 for the water kettle 1, 1' through an opening 26 in the spout lid 20.

In FIG. 1, the heating and rest position for the handle 14 is shown. In this position, the end 18 of the handle 14 comes to rest against the lowermost inner wall of the spout 13. FIG. 2 shows the handle 14 in its raised position, such as will generally occur when the water kettle is being carried, or in a pouring position. In this position, and as a result of the jointed attachment of the end 19 to the lower regions of the upper portion of the water kettle, the handle 14 is swiveled upwardly until the end 18 comes to rest against the uppermost inner wall of the spout 13. This in turn pushes the spout lid 20 upwardly, uncovering the opening of the spout 13. At the same time, the spout lid 20 is tilted to a position above the spout 13, providing a shielded protection against rising steam for the user's hand when grasping the handle. When the water kettle is set down, the spout lid 20 will be returned to the opening of the spout 13 by the weight of the handle 14, automatically enclosing the pouring spout as a result.

The position of the jointed connection 30 for the handle 14 (along the upper portion of the water kettle) will depend upon the geometry of the center of gravity S as shown in FIG. 3. In order for all of the water to be effectively emptied from the kettle, the spout lid 20 must remain in the open position. As shown in FIG. 3, an axis (G) can be defined which passes through the hinge 30 and the lowest point P(O,yo) of the spout 13. As long as the center of gravity S(x,y) lies to the left of the axis (G), counterclockwise torque is developed which gives rise to a force component which acts upon the point where the handle 14 interacts with the pouring spout 13. This operates to keep the spout lid 20 in an open position when the point P(O,yo) of the pouring spout 13 is at its lowest point.

FIG. 4 shows a different jointed connected for a handle 14'. In this case, two hinges 30a and 30b project from the lower regions of the upper portion of the kettle which, together with the center of the spout, form a triangle. In the region where the user's hand will ordinarily grasp the handle 14', the handle parts 14a and 14b are preferably joined together as shown.

Figure 5:
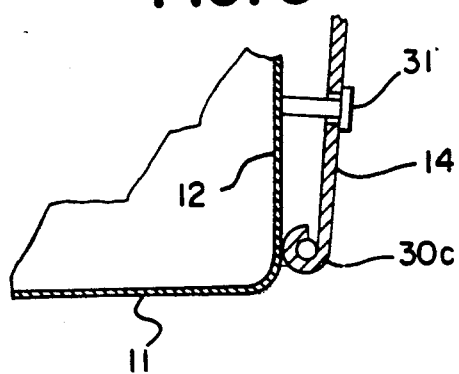
FIG. 5 is an enlarged, partial sectional view showing a hinge for the handle with a stop above the hinge.
Figure 6:
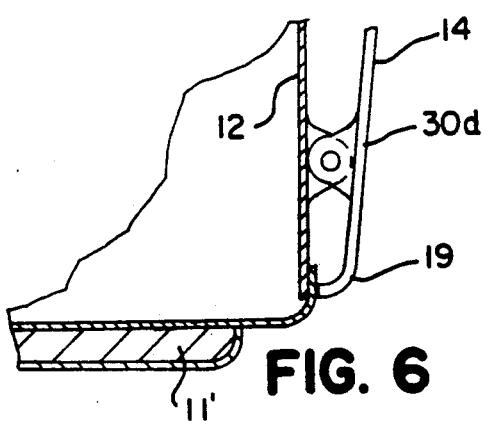
FIG. 6 is an enlarged, partial sectional view showing a hinge for the handle with a stop below the hinge.

FIGS. 5 and 6 show two other jointed connections 30c and 30d for the end 19 of the handle 14 extending from the upper portion 12. In FIG. 5, the hinge 30c is located just above the bottom 11 and the tilt angle for the handle 14 is limited, for example, by a rivet 31. In FIG. 6, the hinge 30d is located slightly above the bottom 11'; however, in this case, the abovedescribed effect of the center of gravity S must be considered. In this example, a bent end 19 of the handle 14 serves as a stop which, when the handle 14 is raised, comes to lie against the lower regions of the upper portion 12 of the water kettle.

Figure 7:
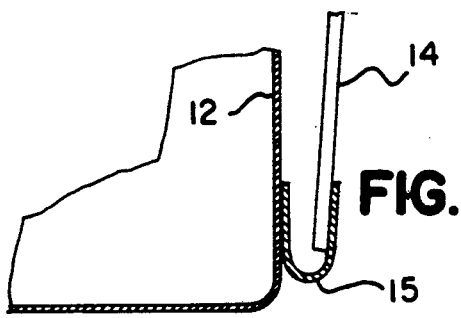
FIG. 7 is an enlarged, partial sectional view showing a spring element for developing the hinged mounting of the handle.

FIG. 7 shows a connection for the handle 14 in which the end 19 of the handle is attached to the upper portion of the water kettle, for example, by a leaf spring 15 which replaces the hinged connection in view of its elasticity.

Figure 8:
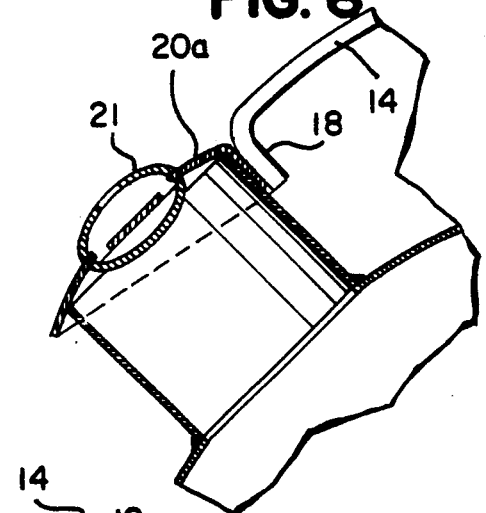
FIG. 8 is an enlarged, partial sectional view of a pouring spout with a spout lid rigidly connected to the handle, and which includes a signalling device.
Figure 9:
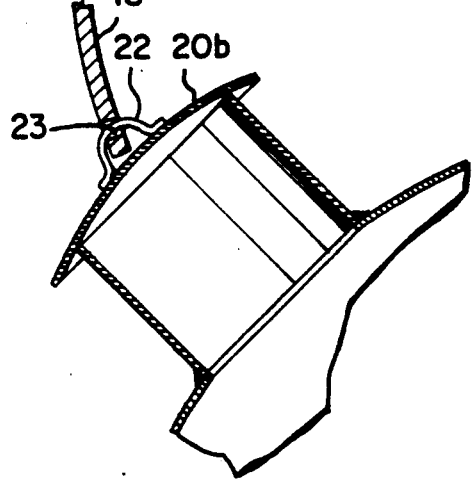
FIG. 9 is an enlarged, partial sectional view of a pouring spout with a spout lid hingedly connected to the handle.

The spout lid 20 mounted on the handle 14 can also have different forms. For example, the spout lid 20a shown in FIG. 8 is rigidly attached to the end 18 of the handle 14, and is equipped in conventional manner with an acoustic sound emitter (e.g., a whistle 21 or a rattle defined, for example, as at least two lid layers including at least one signal opening for the passage of steam, or a steam pipe). The spout lid 20b shown in FIG. 9 is attached to the handle 14 by a hinge developed between an opening 23 formed in the handle 14 and a mounting 22 extending from the spout lid 20b, allowing the spout lid 20b to tilt when the handle 14 is moved to a carrying or pouring position.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A water kettle having a hollow body defined by a flat bottom and a dome-shaped, arched upper portion, a spout extending from the upper portion, and a bracketed handle formed as a hinge-mounted strap with a first end pivoted on an axis of rotation located opposite to the spout and near the bottom of the upper portion, and a second, bent free end extending into said spout for engaging an inner surface of the spout and for receiving a spout lid for covering the spout when the kettle is in a rest position, and for uncovering the spout when the kettle is in a carrying or a pouring position, and wherein the handle has a tilt angle which is limited by at least one stopping means.

2. The kettle of claim 1 wherein the first end of the handle is hinge-mounted in two places to lower regions of the upper portion.

3. The kettle of claim 2 wherein the hinged mountings for the handle form a triangle with the spout.

4. The kettle of claim 1 wherein the spout lid is rigidly connected to the second end of the handle.

5. The kettle of claim 1 wherein the spout lid is movably mounted to the second end of the handle.

6. The kettle of claim 5 wherein the spout lid is hingedly connected to the second end of the handle.

7. The kettle of claim 5 wherein the spout lid includes means for providing a signal when contents of the kettle come to a boil.

8. The kettle of claim 7 wherein the spout lid is capable of a vibrating motion when contents of the kettle come to a boil.

9. The kettle of claim 8 wherein the signalling device is formed as a rattle.

10. The kettle of claim 1 wherein the spout lid has an eccentric opening for receiving the second end of the handle so that the spout lid is capable of being pushed up and away from the spout by lifting the handle, and so that when the handle is released, the spout lid automatically assumes a closing position on the spout.

11. The kettle of claim 10 wherein the spout lid is comprised of at least two lid layers defining at least one signal opening for the passage of steam.

12. The kettle of claim 1 wherein the spout lid in the carrying and pouring positions of the kettle assumes a position for deflecting steam flowing out of the spout so that a user's hand holding the handle is not directly exposed to steam.

13. The kettle of claim 1 wherein the spout lid includes means for deflecting steam flowing out of the spout so that a user's hand holding the handle is not directly exposed to steam in the carrying and pouring positions.

14. The kettle of claim 1 wherein the stopping means for the handle is the bent free end for engaging the spout.

15. The kettle of claim 1 wherein the stopping means for the handle is a stop outside of the spout.

16. The kettle of claim 15 wherein the stopping means for the handle is a stop in the hinged connection for the first end of the handle.

17. The kettle of claim 1 wherein the first end of the handle is connected to lower regions of the upper portion by a spring element.

18. The kettle of claim 1 wherein the kettle further includes a filling and cleaning opening enclosed with a close-fitting lid.

19. The kettle of claim 1 wherein the bottom of the kettle is formed for mating in self-connecting manner with a warmth-maintaining device.

20. The kettle of claim 1 wherein the bottom of the kettle is formed for mating with a casserole.

21. The kettle of claim 1 wherein the handle is rigid fully between the first end and the second end.

* * * * *